US009524337B2

(12) United States Patent
Lee et al.

(10) Patent No.: US 9,524,337 B2
(45) Date of Patent: Dec. 20, 2016

(54) APPARATUS, SYSTEM, AND METHOD FOR DETECTING COMPLEX ISSUES BASED ON SOCIAL MEDIA ANALYSIS

(71) Applicant: Electronics and Telecommunications Research Institute, Daejeon (KR)

(72) Inventors: Chung Hee Lee, Daejeon (KR); Hyeon Jin Kim, Daejeon (KR); Hyun Ki Kim, Daejeon (KR); Hyo Jung Oh, Daejeon (KR); Myung Gil Jang, Daejeon (KR); Yo Han Jo, Seoul (KR); Pum Mo Ryu, Daejeon (KR); Jeong Heo, Daejeon (KR); Mi Ran Choi, Daejeon (KR); Yeo Chan Yoon, Seoul (KR); Yoon Jae Choi, Chuncheon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 494 days.

(21) Appl. No.: 14/023,996

(22) Filed: Sep. 11, 2013

(65) Prior Publication Data
US 2014/0297639 A1    Oct. 2, 2014

(30) Foreign Application Priority Data

Mar. 28, 2013   (KR) .......................... 10-2013-0033232

(51) Int. Cl.
G06F 7/00        (2006.01)
G06F 17/30       (2006.01)
G06Q 50/00       (2012.01)

(52) U.S. Cl.
CPC ..... *G06F 17/30705* (2013.01); *G06F 17/3053* (2013.01); *G06Q 50/00* (2013.01)

(58) Field of Classification Search
CPC .................................................. G06F 17/3053
See application file for complete search history.

(56) References Cited

U.S. PATENT DOCUMENTS

2003/0101104 A1   5/2003   Dimitrova et al.
2008/0294636 A1   11/2008  Kim
(Continued)

FOREIGN PATENT DOCUMENTS

KR   10-2004-0066850   7/2004
KR   10-2010-0106718   10/2010

*Primary Examiner* — Ajith Jacob
(74) *Attorney, Agent, or Firm* — Kile Park Reed & Houtteman PLLC

(57) ABSTRACT

Disclosed are an apparatus, a system, and a method for detecting complex issues based on social media analysis according to the present invention. A system for detecting complex issues based on social media analysis according to the present invention includes: a unit issue detecting unit configured to receive a keyword from a user terminal, and to detect per-type unit issues associated with the received keyword; a complex issue detecting unit configured to detect per-type complex issues from the detected per-type unit issues; a complex issue ranking unit configured to analyze the detected per-type complex issues, and to rank the per-type complex issues based on the analysis result; and a complex issue configuring unit configured to configure the ranked per-type complex issues in a predetermined form that enable users to induce a micro trend, and to provide the configured form to a user.

12 Claims, 11 Drawing Sheets

(56) References Cited

U.S. PATENT DOCUMENTS

2013/0304818 A1\* 11/2013 Brumleve ............... H04L 67/02
　　　　　　　　　　　　　　　　　　　　　709/204
2014/0012511 A1\* 1/2014 Mensinger ............... A61B 5/72
　　　　　　　　　　　　　　　　　　　　　702/19

\* cited by examiner

APPARATUS, SYSTEM, AND METHOD FOR DETECTING COMPLEX ISSUES BASED ON SOCIAL MEDIA ANALYSIS

CROSS-REFERENCE TO RELATED APPLICATIONS

This application claims priority to and the benefit of Korean Patent Application No. 10-2013-0033232 filed in the Korean Intellectual Property Office on Mar. 28, 2013, the entire contents of which are incorporated herein by reference.

TECHNICAL FIELD

The present invention relates to a complex issue detection method, and more particularly, an apparatus, a system, and a method for detecting complex issues based on social media analysis that detect per-type unit issues associated with a received keyword when the keyword about a target of interest is received from a user, classify the detected per-type unit issues into complex issues based on a relation between the detected per-type unit issues, and rank and thereby provide the classified complex issues based on importance.

BACKGROUND ART

A unit issue analysis is a method of finding only an issue associated with a predetermined keyword with respect to the predetermined keyword. For example, unit issues about keyword "Apple" may be "release of Apple iPhone 5", "Apple's patent suit against Samsung", and the like. On the contrary, a complex issue analysis is a technology of not only finding only an issue about a predetermined keyword but also finding even issues associated with a correlation, a competition, and a causality in detail through an interrelation analysis between issues.

Characteristics of such social media analysis technologies according to a related art will be described as follows by taking an example.

1) Recorded Future is a company that holds and services web intelligence and prediction analysis specialized technology based on websites, blogs, and social media. This company provides issues by extracting the issues based on a predetermined event unit, and provides importance information different from a simple frequency based analysis by applying a momentum concept to each issue. An issue search is performed only with respect to an input keyword and the found issues are provided in an order of time.

2) A social matrix of Daumsoft is a service that provides monitoring information in which blogs and twitter texts are analyzed based on a natural language processing technology and a text mining technology. The social matrix provides exposure frequency information of an input keyword for each of social media and provides a correlated word and affirmative/negative information.

3) True story of Saltlux provides a tendency on social media with respect to politicians or persons receiving political attention. The true story is a function specialized in a political field, and compares and thereby displays appearance frequency information of each politics related person on social media.

4) PulseK of KONAN Technology monitors social media, such as Twitter, Facebook, me2day, blogs, and the like, and provides the analysis result as a report. PulseK provides a function of digitizing reputation based on social awareness and liking (affirmation/negation) of the latest 14 days, and monitoring a tendency for each period.

The aforementioned analysis technologies according to the related art generally display only a simple appearance frequency or affirmative/negative information about an input keyword. However, the existing analysis technologies do not complexly analyze related issues in which a keyword does not directly appear, but that is associated with the keyword, issues associated with a competitor, even issues in causality, and the like.

SUMMARY OF THE INVENTION

The present invention has been made in an effort to provide an apparatus, a system, and a method for detecting complex issues based on social media analysis that detect per-type unit issues associated with a received keyword when the keyword about a target of interest is received from a user, classify the detected per-type unit issues into complex issues based on a relation between the detected per-type unit issues, and rank and thereby provide the classified complex issues based on importance.

However, the object of the present invention is not limited to the aforementioned matter and other objects not described above may be clearly understood by those skilled in the art from the following description.

An exemplary embodiment of the present invention provides a system for detecting complex issues based on social media analysis, the system including: a unit issue detecting unit configured to receive a keyword from a user terminal, and to detect per-type unit issues associated with the received keyword; a complex issue detecting unit configured to detect per-type complex issues from the detected per-type unit issues; a complex issue ranking unit configured to analyze the detected per-type complex issues, and to rank the per-type complex issues based on the analysis result; and a complex issue configuring unit configured to configure the ranked per-type complex issues in a predetermined form that enables users to induce a micro trend, and to provide the configured form to a user.

The unit issue detecting unit may extract per-type information predetermined for the keyword, search for unit issues associated with the extracted per-type information, and detect the per-type unit issues based on the found unit issues.

The complex issue detecting unit may calculate a weight indicating a relation between the detected per-type unit issues, and group, into relevant issues, a plurality of unit issues having a relatively high relation based on the calculated weight, and detect the per-type complex issues based on the grouped plurality of relevant issues.

The complex issue configuring unit may configure the ranked complex issues in a form of displaying query-and-correlated word pairs on one side of a screen and displaying a complex issue result about a single pair among the query-and-correlated word pairs in an order of time on another side of the screen when the per-type complex issue is a correlation complex issue, and provide the configured form to the user.

The complex issue configuring unit may configure the ranked complex issues in a form of displaying query-and-compete word pairs on one side of a screen and displaying a complex issue result about a single pair among the query-and-compete word pairs in an order of time on another side of the screen when the per-type complex issue is a competition complex issue, and provide the configured form to the user.

The complex issue configuring unit may configure the ranked complex issues in a form of displaying opinion analysis information about a query on one side of a screen and displaying a complex issue result about opinion cause information on another side of the screen when the per-type complex issue is a causality complex issue, and provide the configured form to the user.

Another exemplary embodiment of the present invention provides an apparatus for detecting complex issues based on social media analysis, the apparatus including: an input unit configured to receive a keyword from a user; a communication unit configured to transmit a search request message including the received keyword and to receive a search response message corresponding to the transmitted search request message; a control unit configured to extract, from the received search response message, information in which per-type complex issues associated with the keyword are configured in a predetermined form when the search response message is received; a display unit configured to display any one of at least one per-type complex issue associated with the keyword received from the user, to be in the predetermined form based on the extracted information; and a storage unit configured to store the extracted per-type complex issues.

The display unit may display query-and-correlated word pairs on one side of a screen and displays a complex issue result about a single pair among the query-and-correlated word pairs in an order of time on another side of the screen when the per-type complex issue is a correlation complex issue, and indicate a relation between the complex issues displayed in an order of time using an arrow indicator link.

The display unit may display query-and-compete word pairs on one side of a screen and display a complex issue result about a single pair among the query-and-compete word pairs in an order of time on another side of the screen when the per-type complex issue is a competition complex issue, and indicate a relation between the complex issues displayed in an order of time using an arrow indicator link.

The display unit may display opinion analysis information about a query on one side of a screen and displays a complex issue result about opinion cause information on another side of the screen when the per-type complex issue is a causality complex issue.

Still another exemplary embodiment of the present invention provides a method of detecting complex issues based on social media analysis, the method including: receiving a keyword from a user terminal, and detecting per-type unit issues associated with the received keyword; detecting per-type complex issues from the detected per-type unit issues; analyzing the detected per-type complex issues, and ranking the per-type complex issues based on the analysis result; and configuring the ranked per-type complex issues in a predetermined form that enables users to induce a micro trend, and providing the configured form to a user.

The detecting of the unit issues may include: extracting per-type information predetermined for the keyword, and searching for unit issues associated with the extracted per-type information; and detecting the per-type unit issues based on the found unit issues.

The detecting of the complex issues may include: calculating a weight indicating a relation between the detected per-type unit issues, and grouping, into relevant issues, a plurality of unit issues having a relatively high relation based on the calculated weight; and detecting the per-type complex issues based on the grouped plurality of relevant issues.

The providing may include configuring the ranked complex issues in a form of displaying query-and-correlated word pairs on one side of a screen and displaying a complex issue result about a single pair among the query-and-correlated word pairs in an order of time on another side of the screen when the per-type complex issue is a correlation complex issue, and providing the configured form to the user.

The providing may include configuring the ranked complex issues in a form of displaying query-and-compete word pairs on one side of a screen and displaying a complex issue result about a single pair among the query-and-compete word pairs in an order of time on another side of the screen when the per-type complex issue is a competition complex issue, and providing the configured form to the user.

The providing may include configuring the ranked complex issues in a form of displaying opinion analysis information about a query on one side of a screen and displaying a complex issue result about opinion cause information on another side of the screen when the per-type complex issue is a causality complex issue, and providing the configured form to the user.

Yet another exemplary embodiment of the present invention provides a method of detecting complex issues based on social media analysis, the method including: receiving a keyword from a user; transmitting a search request message including the received keyword and receiving a search response message corresponding to the transmitted search request message; extracting, from the received search response message, information in which per-type complex issues associated with the keyword are configured in a predetermined form when the search response message is received; displaying any one of at least one per-type complex issue associated with the keyword received from the user, to be in the predetermined form based on the extracted information; and storing the extracted per-type complex issues.

The displaying may include displaying query-and-correlated word pairs on one side of a screen and displaying a complex issue result about a single pair among the query-and-correlated word pairs in an order of time on another side of the screen when the per-type complex issue is a correlation complex issue, and indicating a relation between the complex issues displayed in an order of time using an arrow indicator link.

The displaying may include displaying query-and-compete word pairs on one side of a screen and displaying a complex issue result about a single pair among the query-and-compete word pairs in an order of time on another side of the screen when the per-type complex issue is a competition complex issue, and indicating a relation between the complex issues displayed in an order of time using an arrow indicator link.

The displaying may include displaying opinion analysis information about a query on one side of a screen and displaying a complex issue result about opinion cause information on another side of the screen when the per-type complex issue is a causality complex issue.

According to exemplary embodiments of the present invention, it is possible to monitor issues having a high relation with a unit issue by detecting per-type unit issues associated with a received keyword when the keyword about a target of interest is received from a user, classifying the detected per-type unit issues into complex issues based on a relation between the detected per-type unit issues, and ranking and thereby providing the classified complex issues based on importance.

According to exemplary embodiments of the present invention, it is possible to detect complex issues associated with a predetermined keyword and thus, it is possible to induce a micro trend through a relation analysis between issues.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
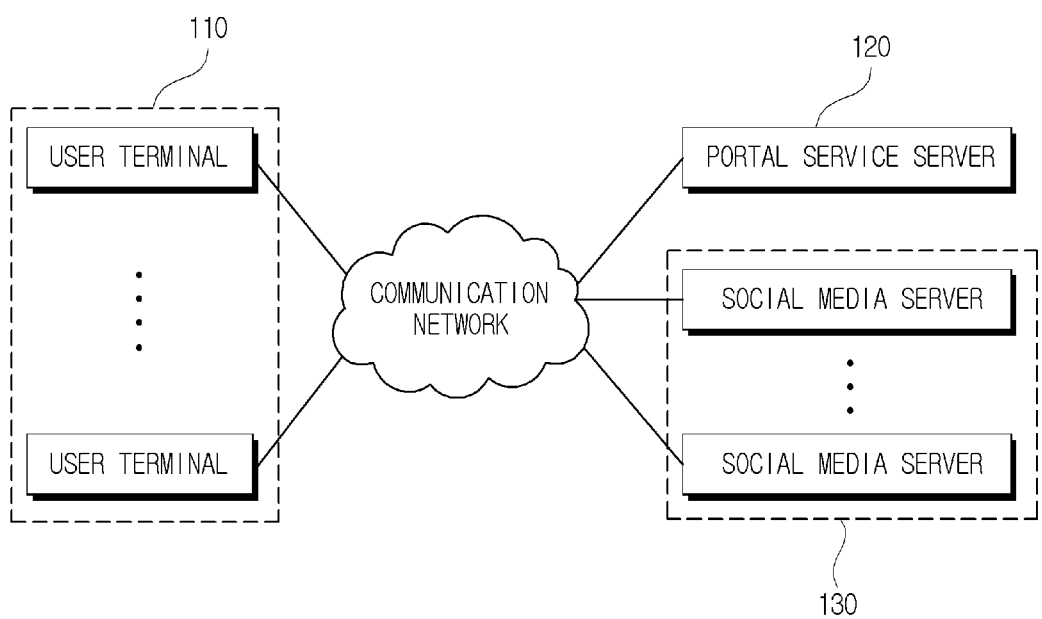
FIG. 1 is a diagram schematically illustrating a configuration of a social network system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus, a system, and a method for detecting complex issues based on social media analysis according to exemplary embodiments of the present invention will be described with reference to the accompanying FIGS. 1 through 11. A description will be made in detail based on a portion required to understand an operation and an effect according to the present invention.

In describing constituent elements of the present invention, different reference numerals may be assigned to constituent elements with the same name based on drawings and like reference numerals may also be assigned thereto although they are illustrated in different drawings. However, even in this case, it does not indicate that a corresponding constituent element has a different function based on an exemplary embodiment or has the same function in different exemplary embodiments. A function of each constituent element should be determined based on an explanation about each constituent element in a corresponding exemplary embodiment.

In particular, the present invention proposes a new method that detects per-type unit issues associated with a received keyword when the keyword about a target of interest is received from a user, classifies the detected per-type unit issues into complex issues based on a relation between the detected per-type unit issues, and ranks and thereby provides the classified complex issues based on importance.

FIG. 1 is a diagram illustrating a social network system according to an exemplary embodiment of the present invention.

As illustrated in FIG. 1, the social network system according to the present invention may include a user terminal 110, a portal service server 120, and a social media server 130.

The user terminal 110 may access the portal service server 120 through wired or wireless communication to receive a keyword about a target of interest from a user, to request at least one complex issue associated with the received keyword and receive at least one complex issue associated with the corresponding keyword.

The portal service server 120 may receive the keyword from the user terminal 110, detect per-type unit issues associated with the received keyword, group and classify, into a plurality of complex issues, the detected per-type unit issues having a high relation based on a relation between the detected per-type unit issues, and rank and thereby provide the classified complex issues based on the importance of each of the classified complex issues.

Herein, the present invention may define complex issues as the following correlation complex issues, competition complex issues, and causality complex issues.

1) The correlation complex issues are issues found based on a relation between issues, and may be determined based on a result of searching for candidate issues based on correlated word information and analyzing connectivity between the found candidate issues.

For example, correlation complex issues associated with keyword "Apple" may be sequentially found, such as <Apple IOS6 announcement>, <IOS6 indicates Dok-do as Dakeshima>, <netizen's no-buy campaign against iPhone>, and the like.

2) The competition complex issues are issues found based on competitiveness between issues, and may be determined based on a result of searching for candidate issues based on compete word information and analyzing connectivity between the found candidate issues.

For example, competition complex issues associated with keyword "Apple" may be sequentially found, such as <Apple's real intention in patent suit against Samsung>, <crisis theory of Samsung Electronics>, and <Samsung's defeat in patent suit>.

3) The causality complex issues are issues found based on causality between issues, and may be determined based on a result of searching for candidate issues based on cause information about a predetermined opinion, for example, pros and cons of a policy, liking and disliking of a person/company, and the like, and analyzing connectivity between the found candidate issues.

For example, in the case of causality complex issues associated with keyword "Apple", <iPhone5 very expected>, <interaction between iPhone5 and iPad mini>, <IOS6 map addition>, and the like, may be found for liking, and <Verdict about Apple impedes innovation>, <Apple indicates Dok-do as Dakeshima>, and the like, may be found for disliking.

The social media server 130 may provide social media such as Twitter, Facebook, and blogs.

Figure 2:
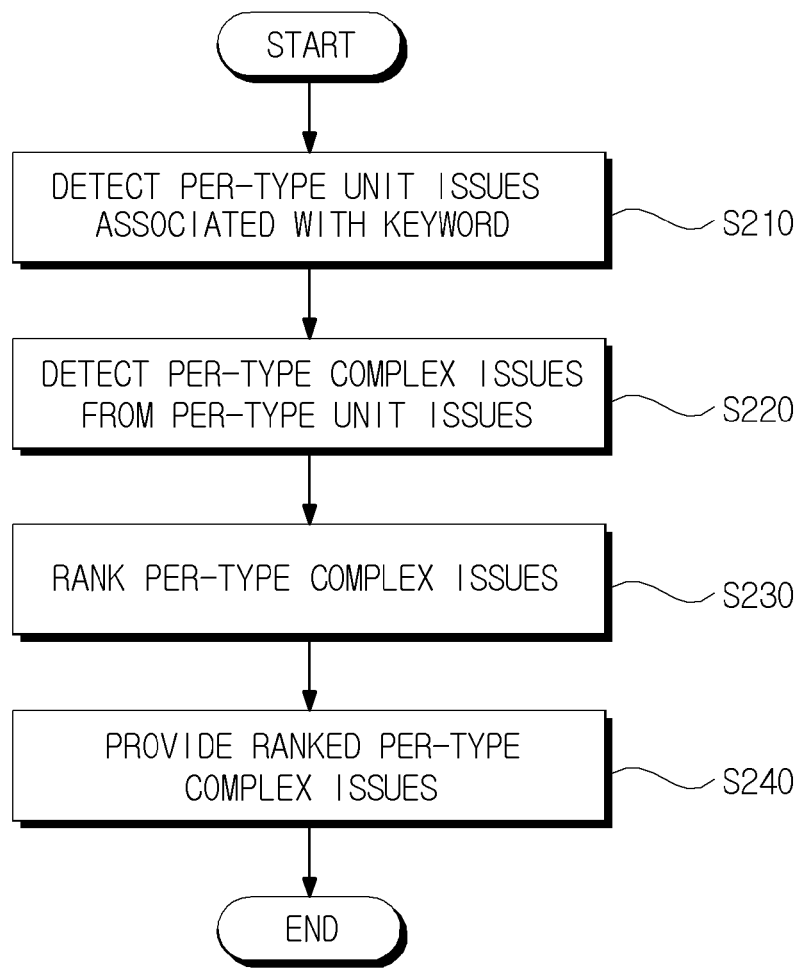
FIG. 2 is a flowchart illustrating a method of detecting complex issues according to an exemplary embodiment of the present invention.

FIG. 2 is a flowchart illustrating a method of detecting complex issues according to an exemplary embodiment of the present invention.

As illustrated in FIG. 2, an apparatus (hereinafter, referred to as a detection apparatus) for detecting complex issues according to the present invention may receive a keyword from the user terminal 110, and may detect per-type unit issues, for example, correlation unit issues, competition unit issues, and causality unit issues, associated with the received keyword (S210). A detecting process thereof will be described in detail as follows.

1) A correlation unit issue detecting process utilizes a correlated word extracting process and a correlated word based issue detecting process. That is, a unit issue detecting unit 122 of FIG. 4 extracts "iPhone5", "patent suit", "IOS6", and the like as correlated words that are per-type information predetermined for input keyword "Apple", searches for issues associated with the extracted correlated words, and detects the found issues as the correlation unit issues.

2) A competition unit issue detecting process utilizes a compete word extracting process and a compete word based issue detecting process. That is, the unit issue detecting unit 122 extracts "Samsung Electronics", "Google", "Nokia", "LG Electronics", and the like as compete words that are per-type information predetermined for the input keyword "Apple", searches for issues associated with the extracted compete words, and detects the found issues as the competition unit issues.

3) A causality unit issue detecting process utilizes an opinion analyzing process and a cause analysis based issue detecting process. That is, the unit issue detecting unit 122 extracts "iPhone5", "iPad mini", and the like, as causes of an opinion, such as pros and cons, liking and disliking, and the like, that are per-type information predetermined for the input keyword "Apple", for example, as causes of liking, extracts "patent suit", "poor performance", "indication of Dakeshima on map", and the like as causes of disliking, searches for issues associated with the extracted cause information, and detects the found issues as the causality unit issues.

Next, the detection apparatus may detect per-type complex issues from the detected per-type unit issues (S220). That is, the detection apparatus may detect the per-type complex issues by analyzing the detected per-type unit issues and grouping, into relevant issues, issues having a high relation based on the analysis result. For example, the detection apparatus may detect at least one correlation complex issue by grouping relevant issues themselves among the detected correlation unit issues.

Next, the detection apparatus may analyze the detected per-type complex issues, and may rank the detected per-type complex issues based on the analysis result (S230). That is, the detection apparatus may analyze the issue importance of the detected per-type complex issues and an issue relation, and may rank the detected per-type complex issues based on the analysis result.

1) An issue importance analysis utilizes an event importance based weight calculating process, an issue momentum based weight calculating process, and a network analysis based weight calculating process.

The event importance based weight calculating process calculates a weight according to a criterion that is predetermined based on importance scores of unit issues about a predetermined event, for example, release of a product, establishment of a policy, appointment of a person, and the like.

The issue momentum based weight calculating process calculates a weight according to a criterion that is predetermined based on momentum importance scores of unit issues found based on a text mining technology.

The network analysis based weight calculating process calculates a weight according to a criterion that is predetermined to assign a high weight to issues having a great ripple effect based on the network analysis result of unit issues.

2) An issue relation analysis utilizes a user information based relation calculating process, an expression pattern based relation calculating process, and an issue pattern based relation calculating process.

The user information based relation calculating process assigns a weight according to a predetermined criterion under the assumption that issues mentioned by the same user are mutually highly related.

The expression pattern based relation calculating process configures in advance, as a pattern database (DB), neighbor context information indicating, as relevant issues, issues that appear as relevant issues in the same sentence, and assigns a weight to issues that appear in a sentence matching a configured pattern according to a predetermined criterion.

The issue pattern based relation calculating process assigns a weight to issues having a similar issue addition and deletion pattern, according to a predetermined criterion. Here, an issue relation that the issue addition and deletion pattern is similar is determined based on a momentum graph of each issue.

Next, the detection apparatus may configure the ranked per-type complex issues in a form that enables a user to induce a micro trend, and may provide the configured form to the user (S240).

Figure 3:
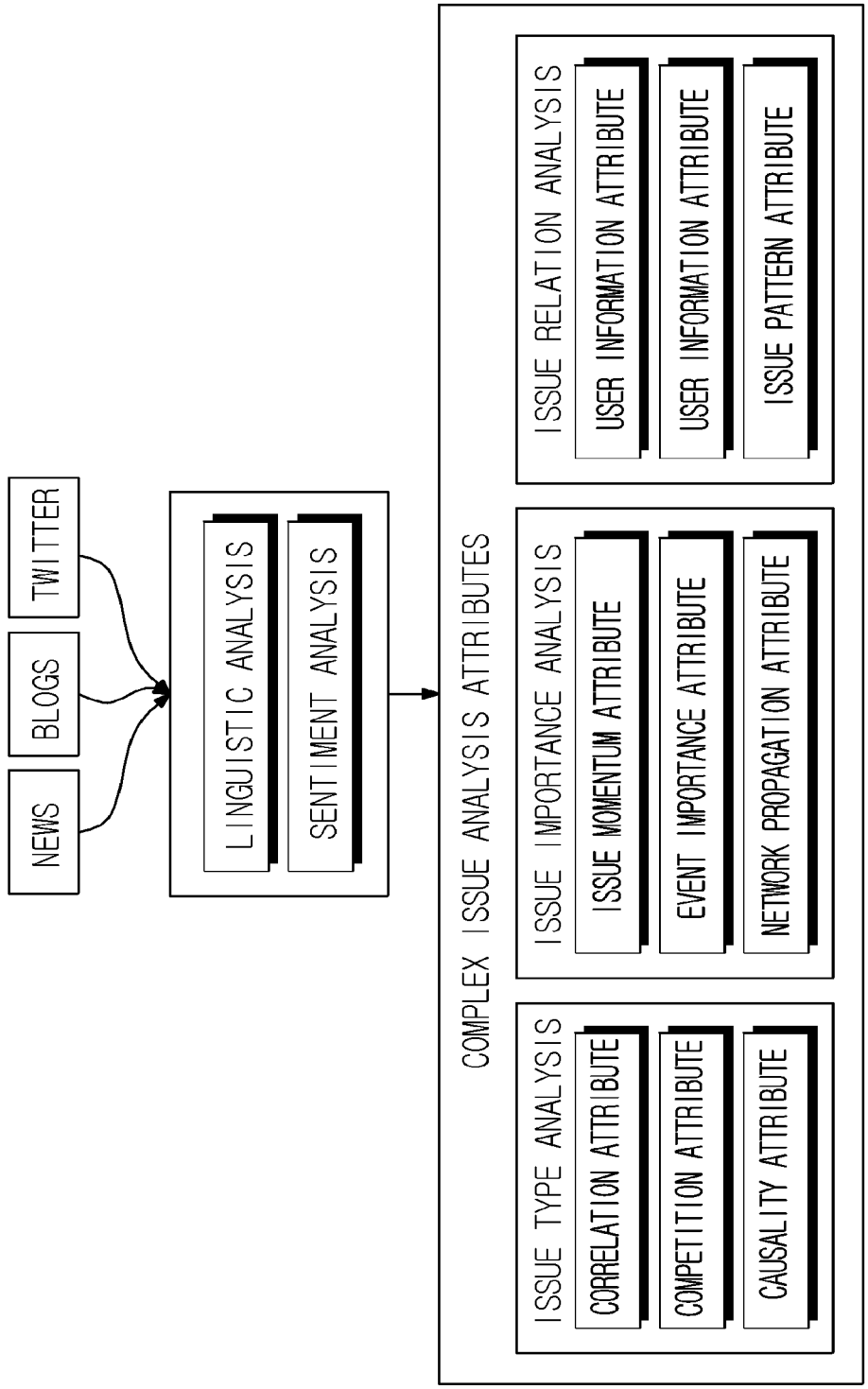
FIG. 3 is a diagram illustrating attributes used for a complex issue analysis according to an exemplary embodiment of the present invention.

FIG. 3 is a diagram illustrating attributes used for a complex issue analysis according to an exemplary embodiment of the present invention.

As illustrated in FIG. 3, the present invention may perform an analysis with respect to social contents such as news, blogs, Twitter, and the like, and may extract detail attributes, that is, complex issue analysis attributes based on linguistic analysis and sentiment analysis results.

Here, 1) a linguistic analysis includes processes, such as a morphological analysis, named entity recognition, chunking, a contextual analysis, relationship extraction, and the like, 2) a sentiment analysis analyzes detail sentiment in addition to affirmation, negation, and neutrality that are simple sentiment.

The complex issue analysis attributes include processes, such as an issue type analysis, an issue importance analysis, and an issue relation analysis.

1) In the issue type analysis, a correlation attribute is based on a correlated word extraction accuracy, a competition attribute is based on a compete word extraction accuracy, and a causality attribute is based on an opinion analysis accuracy.

2) In the issue importance analysis, an issue momentum attribute is based on momentum values of text mining based issues, an event importance attribute is based on an event extraction accuracy of event based issues, and a network propagation attribute is based on a network analysis based issue propagation level.

3) In the issue relation analysis, a user information attribute is based on whether an issue is mentioned by the same user, an expression pattern attribute is based on appearance pattern information of a relevant issue in the same sentence, and an issue pattern attribute is based on issue momentum graph pattern information.

A complex issue relation may be calculated based on such complex issue analysis attributes.

A weight IssueWeight($l_i$) about an issue type and issue importance of issue $l_i$ is expressed as the following Equation 1.

$$IssueWeight(l_i) = \sum_{j=1}^{3} \alpha_j^* itf_j(l_i) + \sum_{k=1}^{2} \beta_k^* mf_k(l_i) + snaf(l_i) \quad \text{[Equation 1]}$$

where, $l_i = i_{th}$ issue($l \in N$), $\sum \alpha = 1$, $\sum \beta = 1$, $$\begin{cases} itf_1(l_i) = \sum Coward_{weight}(k_m), \\ \text{where } k_m \text{ is } m_{th} \text{ term } withinissue l_i \\ itf_2(l_i) = \sum Compete_{weight}(k_m), \\ \text{where } k_m \text{ is } m_{th} \text{ term } withinissue l_i, \\ itf_3(l_i) = \sum Opinion_{weight}(k_m), \\ \text{where } k_m \text{ is } m_{th} \text{ term } withinissue l_i, \end{cases}$$

$$\begin{cases} mf_1(l_i) = \text{the } TM \text{ weight of the issue } l_i, \\ mf_2(l_i) = \text{the event weight of the issue } l_i, \\ snaf(l_i) = \text{the propagation strength of the issue } l_i, \end{cases}$$

Here, N=Q ∪ CW ∪ CT ∪ OP, q denotes a query, Q denotes issues associated with q, CW denotes issues associated with a correlated word of q, CT denotes issues associated with a compete word of q, and OP denotes issues associated with an opinion word of q.

Coword$_{weight}$(k) denotes a correlated word weight calculated when keyword k included in the issue is a correlated word of query q. Compete$_{weight}$(k) denotes a compete word weight calculated when the keyword k included in the issue is a compete word of query q. Opinion$_{weight}$(k) denotes an opinion word weight calculated when the keyword k included in the issue is an opinion word of query q.

A weight of each issue $l_i$ is calculated from the above IssueWeight($l_i$), and issues of which the calculated weight is greater than a threshold t are selected as issues having a high relation or candidate issues. Here, an optimal value of the threshold t is obtained through an experiment according to an application field.

A weight, RelationWeight($I_m$, $I_n$), about a relation between issues $I_m$ and $I_n$ is expressed as the following Equation 2.

$$RelationWeight(I_m, I_n) = \sum_{m=1}^{CP} \sum_{n=1}^{CP} \sum_{i=1}^{3} \gamma_i^* rf_i(I_m, I_n) \quad \text{[Equation 2]}$$

where, $\gamma_i$ = weight of $feature_i$, $$\begin{cases} rf_1(I_m, I_n) = UserInfo(I_m, I_n), \\ rf_2(I_m, I_n) = PatternKB(I_m, I_n) \\ rf_3(I_m, I_n) = IssueGraphPattern(I_m, I_n), \end{cases}$$

$I$ = oneof candidateissues

Here, CP denotes the number of candidate issues.

UserInfo($I_m$, $I_n$) denotes a user information weight calculated when writers of issues $I_m$ and $I_n$ are identical, and the weight is calculated as influence scores of a writer. PatternKB($I_m$, $I_n$) denotes a weight calculated when the issues $I_m$ and $I_n$ appear in the same sentence, and the weight is calculated as scores about a pattern of the corresponding sentence. IssueGraphPattern($I_m$, $I_n$) denotes a weight calculated when per-time issue graphs of issues $I_m$ and $I_n$ are similar, and the weight is calculated as a sum of issue scores of each issue.

For example, the final complex issue results may calculate scores of RelationWeight($I_m$, $I_n$) of each issue, and may provide, as relevant issues, top n issues of which the calculated scores are high.

Figure 4:
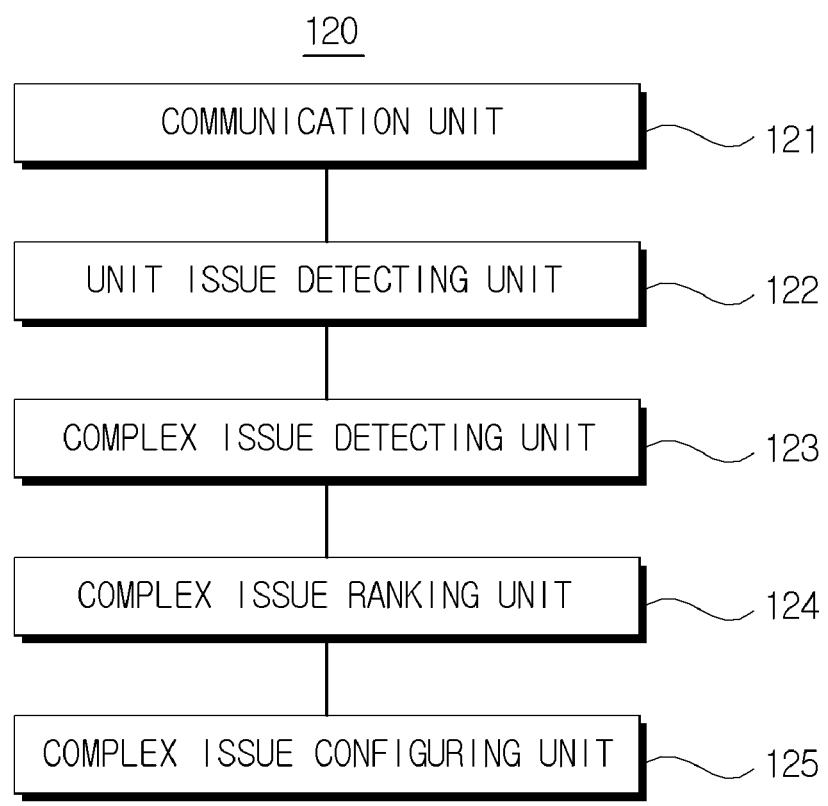
FIG. 4 is a block diagram illustrating a detail configuration of a portal service server according to an exemplary embodiment of the present invention.

FIG. 4 is a block diagram illustrating a detail configuration of the portal service server 120 according to an exemplary embodiment of the present invention.

As illustrated in FIG. 4, the portal service server 120 according to the present invention may include a communication unit 121, the unit issue detecting unit 122, a complex issue detecting unit 123, a complex issue ranking unit 124, and a complex issue configuring unit 125.

The communication unit 121 may transmit and receive various types of data associated with an issue in interaction with the terminal user 110, a plurality of social media servers 130, and the like, through wired or wireless communication.

The unit issue detecting unit 122 may receive a keyword from the user terminal 110, and may detect per-type unit issues, for example, correlation unit issues, competition unit issues, and causality unit issues, associated with the received keyword.

The complex issue detecting unit 123 may detect per-type complex issues from the detected per-type unit issues. That is, the complex issue detecting unit 123 may detect the per-type complex issues by analyzing the detected per-type unit issues and grouping, into relevant issues, issues having a high relation based on the analysis result.

The complex issue ranking unit 124 may analyze the detected per-type complex issues and rank the detected per-type complex issues based on the analysis result. That is, the complex issue ranking unit 124 may rank the detected per-type complex issues by analyzing the issue importance of the detected per-type complex issues and an issue relation between the detected per-type complex issues.

The complex issue configuring unit 125 may configure the ranked per-type complex issues in a predetermined form that enables users to induce a micro trend, and may provide the configured form to a user.

Figure 5:
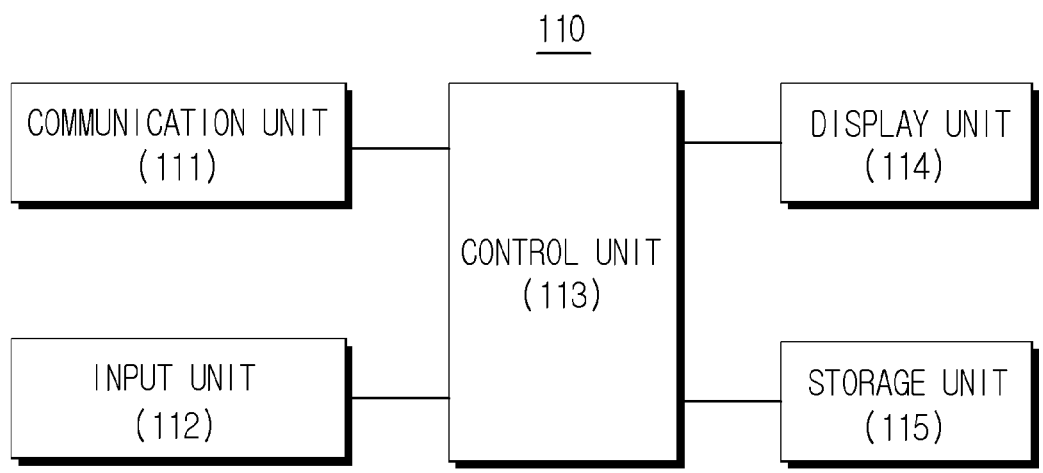
FIG. 5 is a block diagram illustrating a detail configuration of a user terminal according to an exemplary embodiment of the present invention.

FIG. 5 is a block diagram illustrating a detail configuration of the user terminal 110 according to an exemplary embodiment of the present invention.

As illustrated in FIG. 5, the user terminal 110 according to the present invention may include a communication unit 111, an input unit 112, a control unit 113, a display unit 114, and a storage unit 115.

The communication unit 111 may transmit and receive various types of data associated with an issue in interaction with the portal service server 120 through wired or wireless communication. For example, the communication unit 111 may transmit a search request message including a keyword received from a user and, as a response thereto, may receive a search response message.

The input unit 112 may receive information according to the user's menu or key manipulation.

When the keyword is received from the user, the control unit 113 may generate a search request message including the received keyword, transmit the generated search request message through the communication unit 111, receive the search response message through the communication unit 111, and extract, from the received search response message, search results, that is, per-type complex issues associated with the corresponding keyword.

The display unit 114 may display the extracted per-type complex issues associated with the corresponding keyword, for example, correlation complex issues, competition complex issues, and causality complex issues.

The storage unit 150 may store the per-type complex issues associated with the received corresponding keyword.

Figure 6:
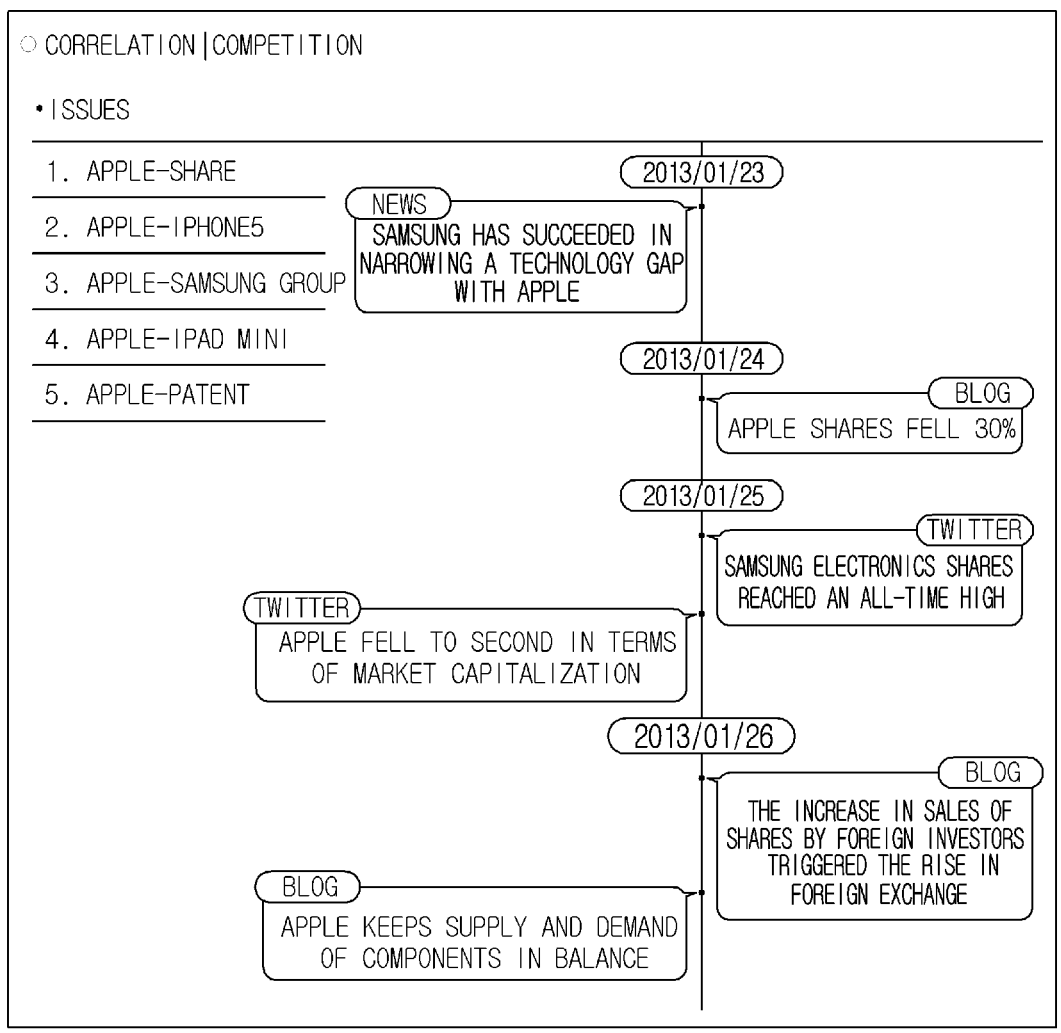
FIG. 6 is a diagram displaying correlation complex issues on a screen according to an exemplary embodiment of the present invention.

FIG. 6 is a diagram displaying correlation complex issues on a screen according to an exemplary embodiment of the present invention.

As illustrated in FIG. 6, query-and-correlated word pairs are displayed on the left side of a screen, and a complex issue result about a single pair among the left query-and-correlated word pairs is displayed on a timeline on the right side of the screen. A complex issue is a result of extracting, from among unit issues of a query and a correlated word, unit issues having a high mutual relation. Based on unit issues extracted as the complex issue, a unit issue about a query keyword is displayed on the left side of the timeline and a unit issue about a correlated word is displayed on the right side of the timeline.

A relation between issues on the timeline may be expressed through an arrow indicator link.

For example, results about query "Apple" are displayed on the screen. Top five correlated words, "share", "iPhone 5", "Samsung group", "iPad mini", and "patent", among correlated words of "Apple", and query keyword pairs are displayed on the left side of the screen and a complex issue result about an "Apple-share" pair is displayed on the right side of the screen. A unit issue result about "Apple" among the complex issue results is displayed on the left side of the timeline and a unit issue result about "share" among the complex issue results is displayed on the right side of the timeline.

Figure 7:
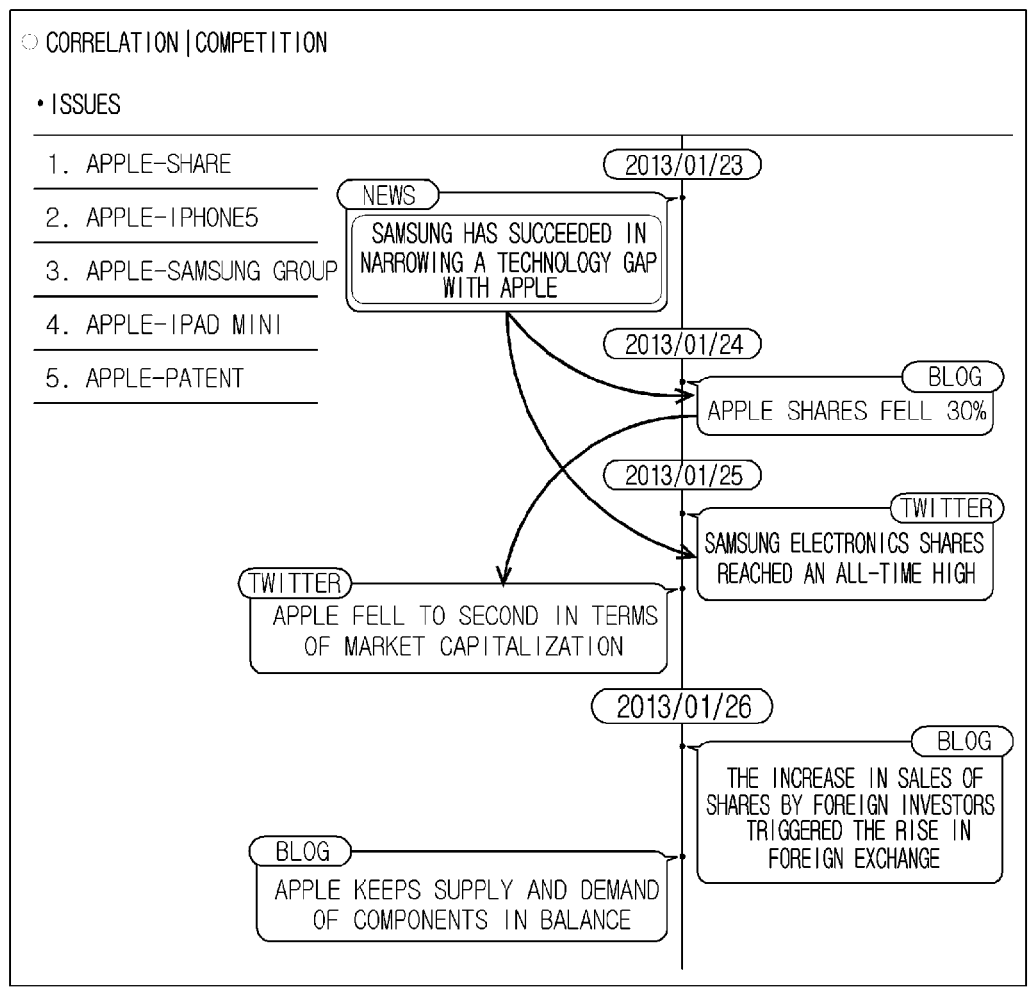
FIG. 7 is a diagram illustrating relevant issues of a predetermined issue among correlation complex issue results of FIG. 6.

FIG. 7 is a diagram illustrating relevant issues of a predetermined issue among the correlation complex issue results of FIG. 6.

FIG. 7 illustrates a relation arrow indicator link result displayed when clicking on a predetermined issue among the correlation complex issue results. For example, the relation arrow indicator link result is a result of clicking on an issue "Samsung has succeeded in narrowing a technology gap with Apple" among unit issues of "Apple" among the unit issues of "Apple".

Figure 8:
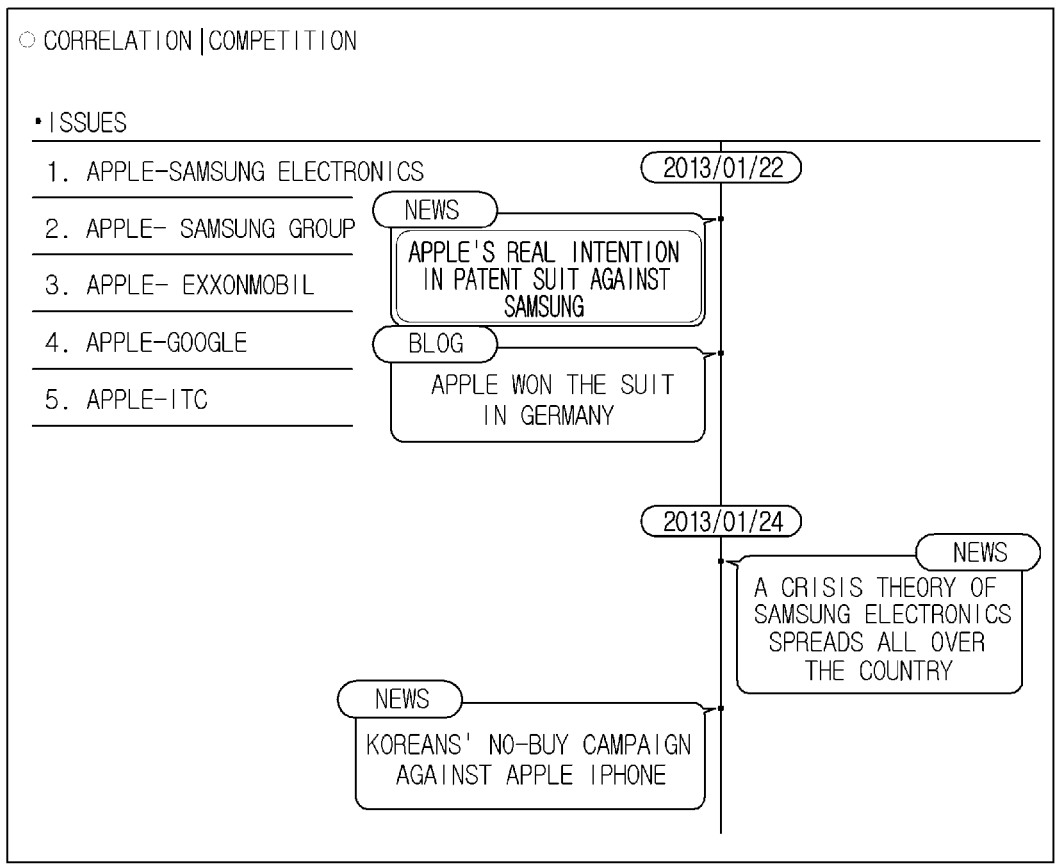
FIG. 8 is a diagram displaying competition complex issues on a screen according to an exemplary embodiment of the present invention.

FIG. 8 is a diagram displaying competition complex issues on a screen according to an exemplary embodiment of the present invention.

As illustrated in FIG. 8, query-and-compete word pairs are displayed on the left side of a screen and a complex issue result about a single pair among the left query-and-compete word pairs is displayed on the right side of the screen. A complex issue is a result of extracting, from among unit issues of a query and a compete word, unit issues having a high mutual relation. Based on unit issues extracted as the complex issue, a unit issue about a query keyword is displayed on the left side of a timeline and a unit issue about a compete word is displayed on the right side of the timeline.

A relation between issues on the timeline may be expressed through an arrow indicator link.

For example, results about query "Apple" are displayed on the screen. Top five compete words, "Samsung Electronics", "Samsung group", "ExxonMobil", "Google", and "ITC", among compete words of "Apple", and query keyword pairs are displayed on the left side of the screen, and a complex issue result about an "Apple-Samsung Electronics" is displayed on the right side of the screen. A unit issue result about "Apple" among the complex issue results is displayed on the left side of the timeline and a unit issue result about "Samsung Electronics" among the complex issue results is displayed on the right side of the timeline.

Figure 9:
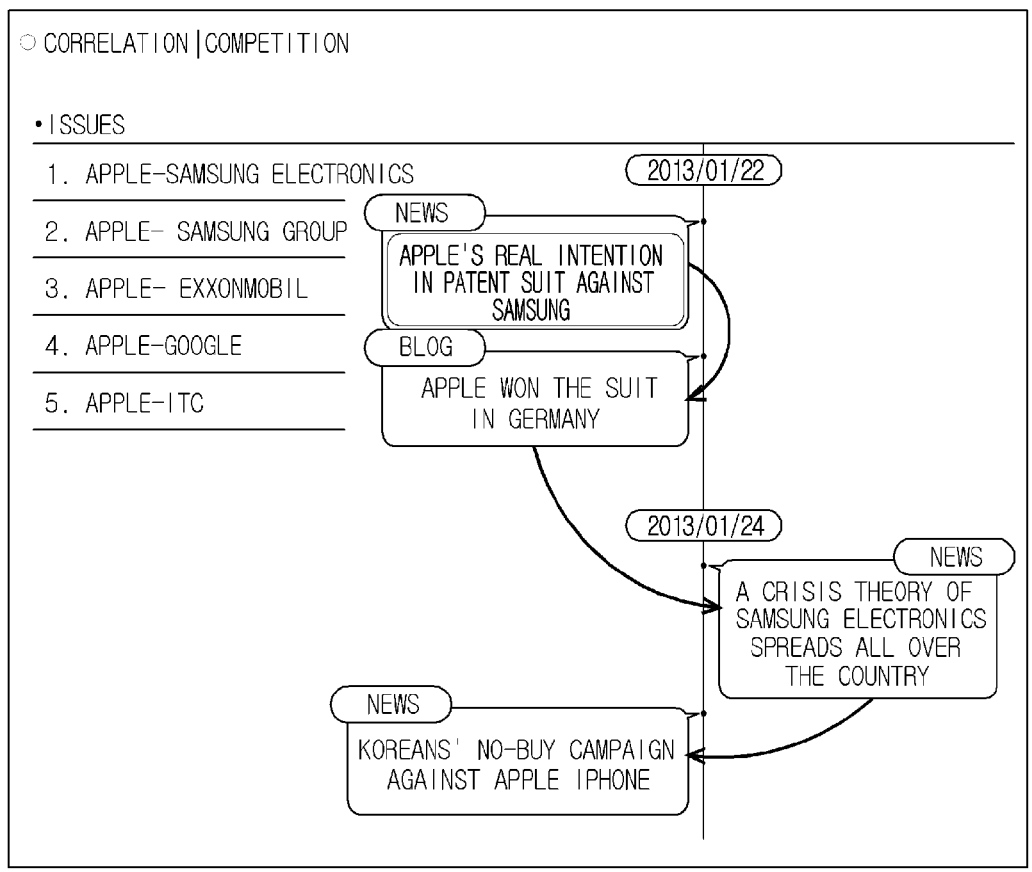
FIG. 9 is a diagram displaying a predetermined issue among competition complex issue results of FIG. 8.

FIG. 9 is a diagram displaying a predetermined issue among the competition complex issue results of FIG. 8.

FIG. 9 illustrates a relation arrow indicator link result displayed when clicking on a predetermined issue among the correlation complex issue results. For example, the relation arrow indicator link result is a result of clicking on an issue "Apple's real intention in patent suit against Samsung" among the unit issues of "Apple".

Figure 10:
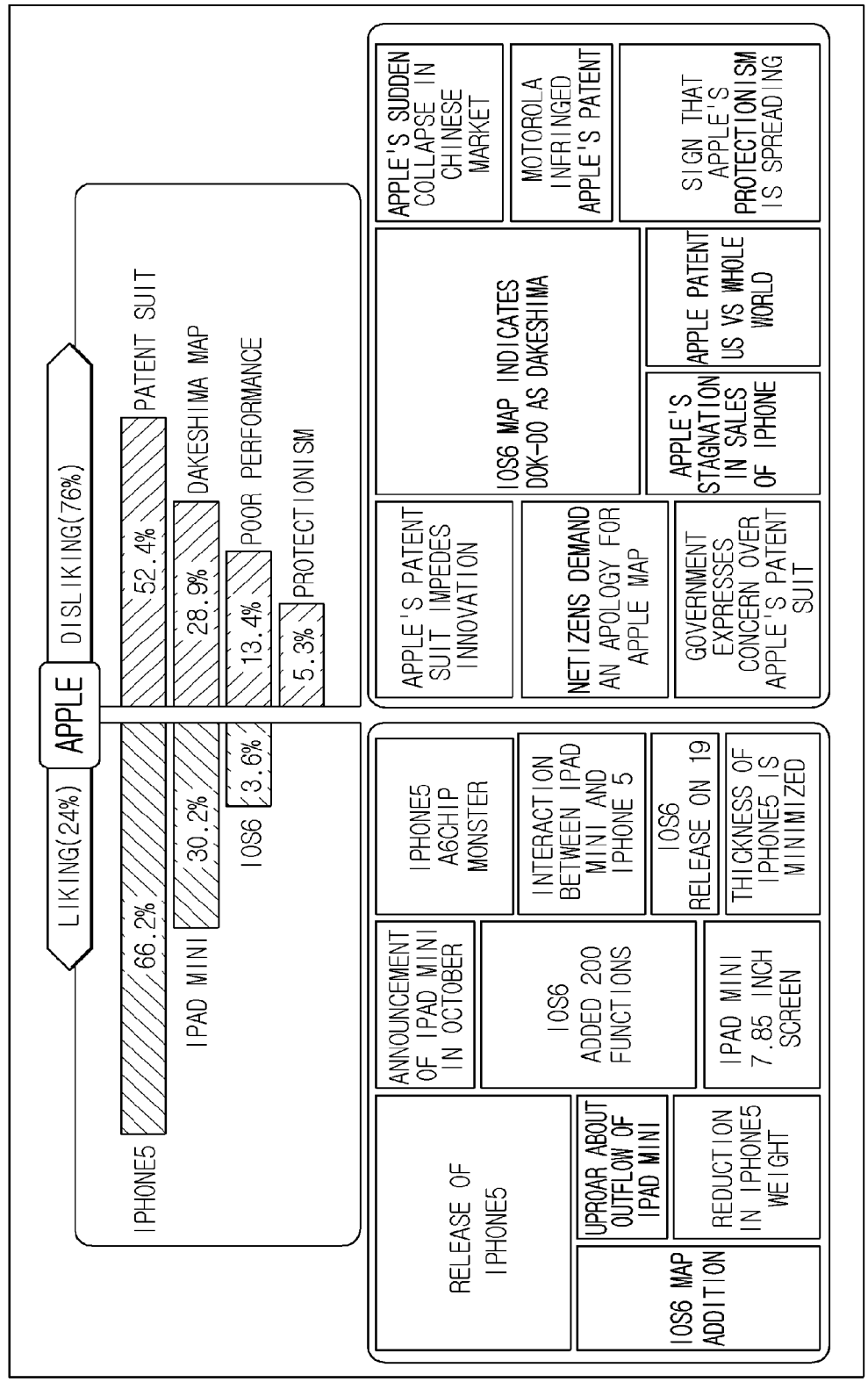
FIG. 10 is a diagram displaying causality complex issues on a screen according to an exemplary embodiment of the present invention.

FIG. 10 is a diagram displaying causality complex issues on a screen according to an exemplary embodiment of the present invention.

As illustrated in FIG. 10, causality complex issues are displayed on the screen. Reasons of liking and reasons of disliking that are opinion analysis information about query "Apple" are displayed on the screen and complex issues associated with an opinion cause are displayed below the opinion analysis information, based on an issue having a high relation. For example, "release of iPhone5", "announcement of iPad mini in October", "iPhone5 A6 chip monster", and the like, were found as complex issues about "iPhone5", "iPad mini", and "IOS6" that are reasons of liking "Apple", and "Apple's patent suit impedes innovation", "Apple's sudden collapse in Chinese market", and the like, were found as complex issues about "patent suit", "Dakeshima map", "poor performance", and "protectionism" that are reasons of disliking "Apple".

A temporal causality between the respective complex issues found as above is not analyzed. Accordingly, the complex issue search results are not displayed in an order of time. Only size information is displayed based on issue importance. An issue about the same reason is classified using the same color and thereby displayed.

Figure 11:
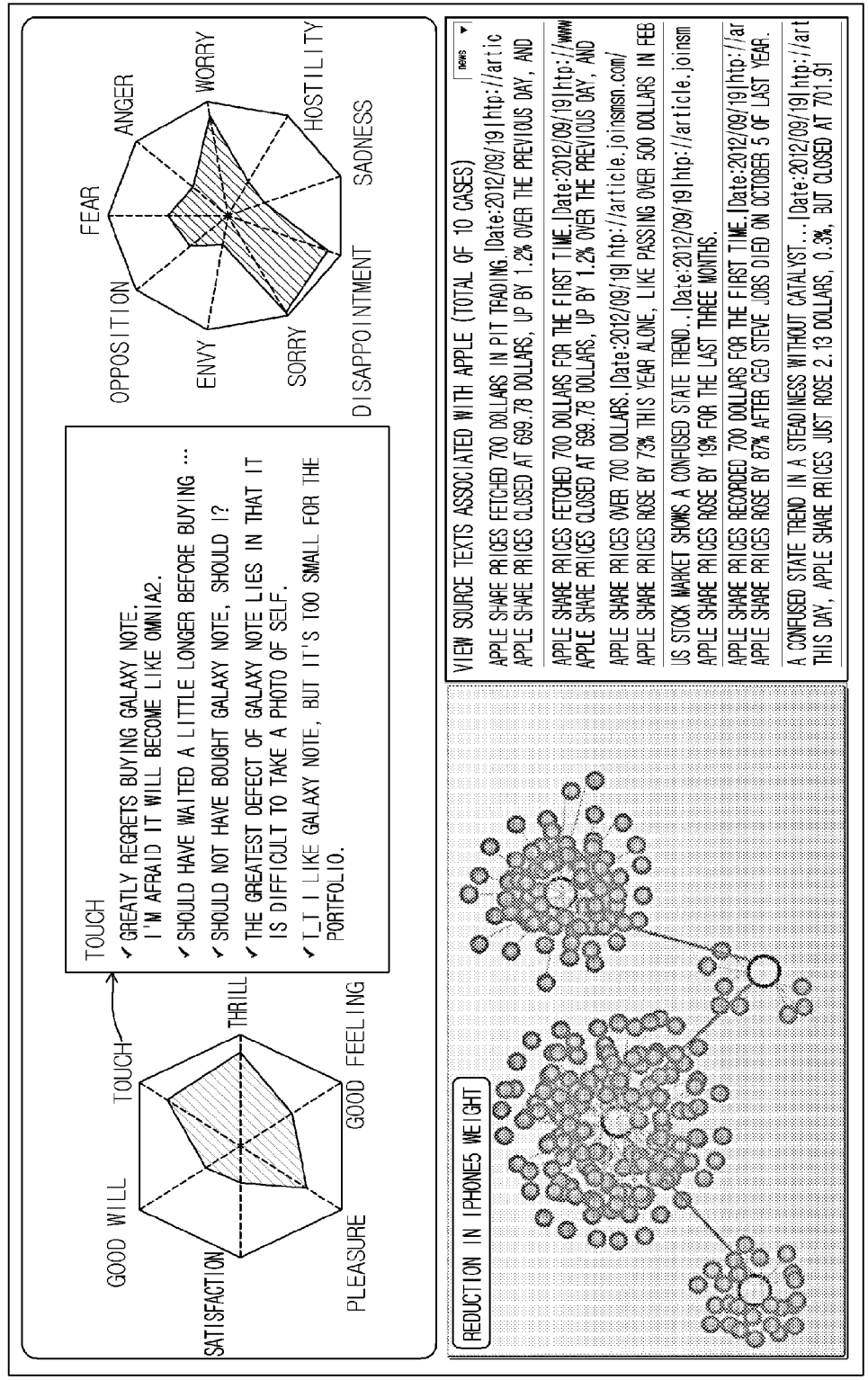
FIG. 11 is a diagram displaying a result of clicking on a predetermined issue among causality complex issue results of FIG. 10.

FIG. 11 is a diagram displaying a result of clicking on a predetermined issue among the causality complex issue results of FIG. 10.

As illustrated in FIG. 11, detail sentiment information of users about a clicked issue is displayed on the screen using a radial graph, and source text information from which sentiment is extracted is displayed when clicking on a predetermined detail sentiment. That is, a result of clicking on "reduction in iPhone5 weight" among the results of FIG. 10 is displayed on the left bottom of the detail sentiment information. A network propagation aspect of the clicked corresponding issue and source text information from which the corresponding issue is extracted are displayed on the right bottom of the detail sentiment information.

Meanwhile, even though all of the constituent elements constituting the aforementioned exemplary embodiments of the present invention are described to be combined into one or combine and thereby operate, the present invention is not necessarily limited to the exemplary embodiments. That is, within the scope of the present invention, all of the constituent elements may be selectively combined into at least one and thereby operate. Even though each of the constituent elements may be configured as single independent hardware, a portion of or all of the constituent elements may be selectively combined into one or configured as a computer program having a program module configured to perform a portion of or all of functions combined from single or a plurality of hardware. Such computer program may be stored in computer readable media such as a USB memory, a CD, flash memory, and the like, and be read and executed by a computer. Storage media of the computer program may include magnetic storage media, optical storage media, carrier wave media, and the like.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for detecting complex issues based on social media analysis, the system comprising:
    a unit issue detecting unit configured to receive a keyword from a user terminal, and to detect per-type unit issues associated with the received keyword;
    a complex issue detecting unit configured to detect per-type complex issues from the detected per-type unit issues;
    a complex issue ranking unit configured to analyze the detected per-type complex issues, and to rank the per-type complex issues based on the analysis result; and
    a complex issue configuring unit configured to configure the ranked per-type complex issues in a predetermined form of displaying the ranked per-type complex issues on a screen that enables users to induce a micro trend, and to provide the configured form to a display unit of the user terminal.

2. The system of claim 1, wherein the unit issue detecting unit extracts per-type information predetermined for the keyword, searches for unit issues associated with the extracted per-type information, and detects the per-type unit issues based on the found unit issues.

3. The system of claim 1, wherein the complex issue detecting unit calculates a weight indicating a relation between the detected per-type unit issues, and groups, into relevant issues, a plurality of unit issues having a relatively high relation based on the calculated weight, and detects the per-type complex issues based on the grouped plurality of relevant issues.

4. The system of claim 1, wherein the complex issue configuring unit configures the ranked complex issues in a form of displaying query-and-correlated word pairs on one side of the screen and displaying a complex issue result about a single pair among the query-and-correlated word pairs in an order of time on another side of the screen when the per-type complex issue is a correlation complex issue, and provides the configured form to the user.

5. The system of claim 1, wherein the complex issue configuring unit configures the ranked complex issues in a form of displaying query-and-compete word pairs on one side of the screen and displaying a complex issue result about a single pair among the query-and-compete word pairs in an order of time on another side of the screen when the per-type complex issue is a competition complex issue, and provides the configured form to the user.

6. The system of claim 1, wherein the complex issue configuring unit configures the ranked complex issues in a form of displaying opinion analysis information about a query on one side of the screen and displaying a complex issue result about opinion cause information on another side of the screen when the per-type complex issue is a causality complex issue, and provides the configured form to the user.

7. A method of detecting complex issues based on social media analysis, the method comprising:
    receiving a keyword from a user terminal, and detecting per-type unit issues associated with the received keyword;
    detecting per-type complex issues from the detected per-type unit issues;
    analyzing the detected per-type complex issues, and ranking the per-type complex issues based on the analysis result; and
    configuring the ranked per-type complex issues in a predetermined form of displaying the ranked per-type complex issues on a screen that enables users to induce a micro trend, and providing the configured form to a display unit of the user terminal.

8. The method of claim 7, wherein the detecting of the unit issues comprises:
    extracting per-type information predetermined for the keyword, and searching for unit issues associated with the extracted per-type information; and
    detecting the per-type unit issues based on the found unit issues.

9. The method of claim 7, wherein the detecting of the complex issues comprises:
    calculating a weight indicating a relation between the detected per-type unit issues, and grouping, into relevant issues, a plurality of unit issues having a relatively high relation based on the calculated weight; and
    detecting the per-type complex issues based on the grouped plurality of relevant issues.

10. The method of claim 7, wherein the providing comprises:
    configuring the ranked complex issues in a form of displaying query-and-correlated word pairs on one side of the screen and displaying a complex issue result about a single pair among the query-and-correlated word pairs in an order of time on another side of the screen when the per-type complex issue is a correlation complex issue, and providing the configured form to the user.

11. The method of claim 7, wherein the providing comprises:
 configuring the ranked complex issues in a form of displaying query-and-compete word pairs on one side of the screen and displaying a complex issue result about a single pair among the query-and-compete word pairs in an order of time on another side of the screen when the per-type complex issue is a competition complex issue, and providing the configured form to the user.

12. The method of claim 7, wherein the providing comprises:
 configuring the ranked complex issues in a form of displaying opinion analysis information about a query on one side of the screen and displaying a complex issue result about opinion cause information on another side of the screen when the per-type complex issue is a causality complex issue, and providing the configured form to the user.

* * * * *